United States Patent [19]

Gawron et al.

[11] 4,220,196

[45] Sep. 2, 1980

[54] HEAT STORAGE DEVICE

[75] Inventors: Klaus Gawron, Aachen, Fed. Rep. of Germany; Faramarz Mahdjuri, Bergamo, Italy; Johann Schröder, Aachen, Fed. Rep. of Germany

[73] Assignee: U.S. Philips Corporation, New York, N.Y.

[21] Appl. No.: 899,069

[22] Filed: Apr. 24, 1978

[30] Foreign Application Priority Data

May 5, 1977 [DE] Fed. Rep. of Germany ....... 2720188
Oct. 3, 1977 [DE] Fed. Rep. of Germany ....... 2744468

[51] Int. Cl.² .......................................... F28D 21/00
[52] U.S. Cl. .................................. 165/11 R; 165/46; 165/104 S; 126/400
[58] Field of Search ....................... 165/46, 104 S, 11; 126/400; 62/529, 530, 430

[56] References Cited

FOREIGN PATENT DOCUMENTS 1018835 10/1952 France ....................................... 62/530

Primary Examiner—Albert W. Davis
Attorney, Agent, or Firm—Thomas A. Briody; William J. Streeter; Rolf E. Schneider

[57] ABSTRACT

A heat storage device comprising a closed reservoir within which is positioned a flexible closed container of smaller volume. The flexible container encloses a liquefiable heat-accumulating material; and the reservoir is provided with a heat-transport medium outside of the flexible container. The heat-transport medium always remains in the liquid phase and, upon solidification and shrinkage of the heat-accumulating material, fills the spaces thus formed between the flexible container and the reservoir wall in order to maintain adequate transfer of heat.

5 Claims, 4 Drawing Figures

HEAT STORAGE DEVICE

This invention relates to a heat storage device, comprising at least one reservoir which contains a material which accumulates heat by transition from the solid to the liquid phase and which is capable of exchanging heat via at least one heat transmitting reservoir wall, the reservoir moreover containing a quantity of a heat transport medium which is separated from the heat-accumulating material by at least one flexible, movable partition.

A heat storage device of the described kind is known from U.S. Pat. No. 4,033,130.

The heat storage device described therein forms part of a combined heating/heat transport system in which a heat pipe accommodates one or more closed reservoirs which contain a heat accumulating material which can be heated by means of a primary heat source and which is capable, as a secondary heat source, of exchanging heat with a small quantity of liquid present in the heat pipe space via one or more heat transmitting reservoir walls. This liquid transports heat from the reservoirs to the heat user by way of an evaporation/condensation cycle. Each of the reservoirs also contains a small quantity of evaporable liquid which ensures that the vapour pressures in the reservoirs are at least substantially equal to the vapour pressure in the heat pipe space at any operating temperature. The reservoir walls are thus pressure-relieved.

A flexible partition is locally provided in each of the reservoirs between the heat accumulating material and the evaporable liquid, the exclusive purpose of said partition being the prevention of chemical reactions between the heat accumulating material and the evaporable liquid.

In latent heat accumulators, operating in the range of from 0° to 100° C., use is made of a heat accumulating material, for example, salt hydrates which are characterized inter alia by high melt enthalpies. These salt hydrates melt at constant temperature and exhibit a reduction of volume or an increase in density of up to 10% upon transition from the liquid to the solid phase.

This volume reduction causes heat transfer problems. Upon solidification of the heat accumulating material, the contact surface area between this heat accumulating material and the heat transmitting reservoir wall substantially decreases.

For example, it has been found that when use is made of $Na_2HPO_4.12H_2O$ as the heat accumulating material, a volume reduction of 3.4% occurs upon solidification, with the result that the contact surface area decreases from 100% to approximately 60%.

The present invention has for its object to provide an improved device of the described kind in which a suitable heat transfer between the heat accumulating material and the heat transmitting reservoir wall is ensured under all operating conditions, whilst the separation of heat accumulating material and heat transport medium is maintained.

In order to realize this object, the heat storage device in accordance with the invention is characterized in that the flexible partition extends completely or substantially completely across the surface of the heat transmitting reservoir wall, between this reservoir wall and the heat accumulating material, the heat transport medium being a heat-conductive substance which remains completely or substantially completely in the liquid phase throughout the effective temperature range of the device and which completely fills spaces formed between the flexible partition and the heat transmitting reservoir wall due to thermal shrinkage of the heat accumulating material upon solidification of this material.

Depending on the effective temperature range of the accumulator, the heat transport medium may be, for example, water, aqueous salt solutions, or organic liquids such as oil.

The heat accumulating material, enclosed by the flexible, movable partition, can be distributed between various, comparatively small, individually closed units. For mechanical stabilisation, the heat accumulating material may be mixed with porous materials, constructed as a network, such as, for example, foamed synthetic material or metal wool. Moreover, phase separation by sedimentation (stratification) of the heat accumulating material is thus avoided.

A preferred embodiment of the heat storage device in accordance with the invention is characterized in that the reservoir is provided with a device for measuring the liquid level of the heat transport medium.

The volume variation of the heat accumulating material which accompanies the phase transition (at constant temperature) of this material causes variation of the heat transport medium liquid level. This liquid level is thus a measure for the heat content and hence the degree of charging of the accumulator.

The device for measuring the such liquid level offers the advantage that the degree of charging of the heat accumulator can thus be simply determined.

In accordance with the invention, this liquid level measuring device may be capable of controlling a device for supplying heat to or extracting heat from the heat accumulating material.

In a further preferred embodiment of the heat storage device in accordance with the invention, the heat transport medium liquid level is situated in a constricted upper portion of the reservoir.

This is a structurally attractive solution.

A further preferred embodiment of the heat storage device in accordance with the invention is characterized in that the specific weight of the heat transport medium is lower than that of the heat accumulating material.

This offers the advantage that the heat accumulating material does not tend to rise in the heat transport medium, so that the former material need not be anchored.

The invention will now be described in detail with reference to the accompanying drawings, in which.

Figure 1:
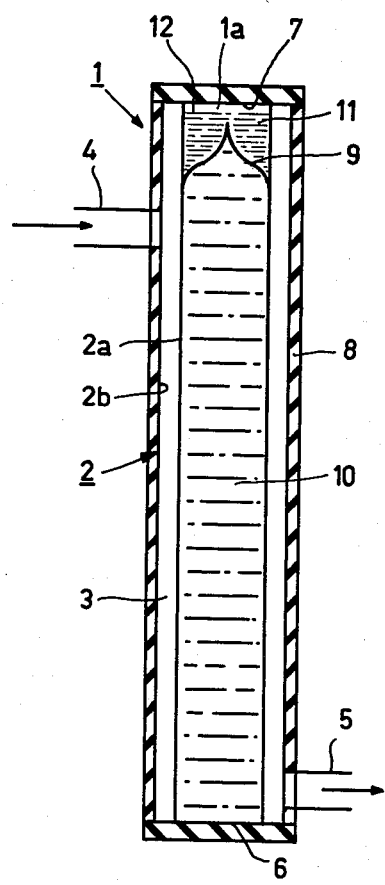
FIG. 1 is a longitudinal sectional view of a heat storage device, the heat accumulating material being in the molten condition.
Figure 2:
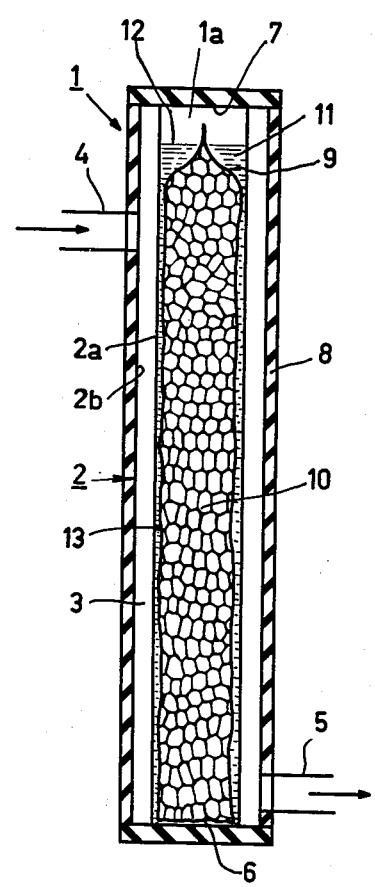
FIG. 2 shows the heat storage device of FIG. 1, the heat accumulating material being in the solid phase.

The FIGS. 1 and 2 show a reservoir 1 which comprises a cylindrical sidewall which is constructed as a heat exchanger 2.

The heat exchanger 2 comprises an inner wall 2a and an outer wall 2b wherebetween a duct 3 is formed; an inlet 4 and an outlet 5 for a heat exchange medium, such as water or air, open into said duct 3.

The reservoir 1 furthermore comprises a lower boundary wall 6 and an upper boundary wall 7, its outer side being provided with a layer of heat insulating material 8.

The reservoir 1 accommodates a closed container 9 which is made of a flexible synthetic material, for example, polyethylene foil, which is filled with a heat accumulating material 10.

The reservoir 1 furthermore contains a suitably thermally conductive liquid heat transport medium 11 which remains completely or substantially completely in the liquid phase (low vapour pressure) throughout the effective temperature range.

The heat accumulating material 10 is, for example, a salt hydrate and the heat transport medium 11 is, for example, a silicone oil.

In the operating condition shown in FIG. 1, the heat accumulating material 10 is in the liquid phase, the entire surface of the flexible wall 9 of synthetic material, except for its two ends, contacts the heat transmitting wall 2a of the heat exchanger 2, and the level 12 of the heat transport medium liquid 11 in the reservoir 1 is comparatively high.

In the operating condition shown in FIG. 2, the heat accumulating material 10 has solidified and occupies a smaller volume in comparison with the situation shown in FIG. 1. The wall 9 of flexible synthetic material barely contacts the heat exchanger wall 2a. Suitable transfer of heat, however, is still ensured, because the heat transfer medium liquid 11 fills the space 13 between the walls 9 and 2a. This liquid in the reservoir 1 is now at a lower level 12.

FIGS. 1 and 2 show that the upper volume portion 1a of the reservoir 1 serves as an expansion space.

As a result of heat transport medium the comparatively very small quantity of liquid 11 present, the absolute cubic thermal expansion thereof is negligibly small during operation in comparison with that of the heat accumulating material.

Figure 3:
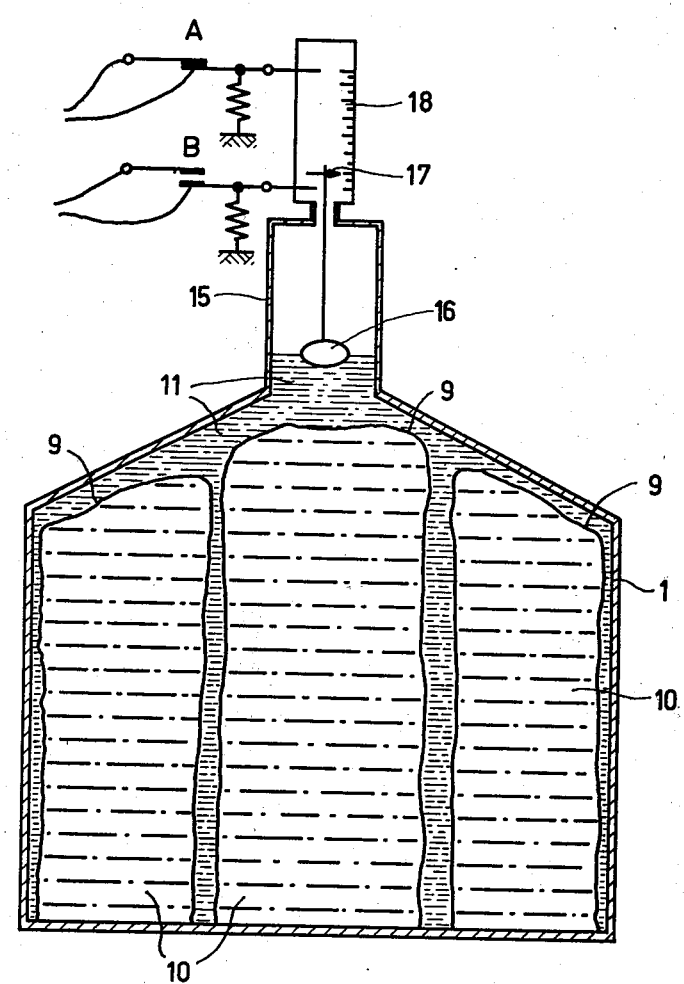
FIGS. 3 and 4 are longitudinal sectional views of heat storage devices including for measuring the level of the heat transport medium liquid.

The reservoir 1 of FIG. 3 comprises three flexible containers 9 of synthetic material, filled with heat accumulating material 10.

The heat transfer medium level of the liquid 11 is situated in the neck 15 of the reservoir 1. A float 16 supports a needle 17 which indicates the liquid level on a scale 18, thus providing an indication as regards the degree of charging of the heat accumulating material.

The needle 17 may be used for control purposes. To this end, electrical switches A and B are arranged at two different levels. When the needle 17 mechanically contacts the switch B at the lower level (heat accumulator virtually discharged), for example, electrical heating elements (not shown) arranged in the heat accumulating material 10 are switched on, or a valve is opened in a duct system which is in heat exchanging contact with the reservoir 1 and in which a liquid can then circulate in order to charge the accumulator (inlet duct 4 of FIG. 1).

When the needle reaches the level of the switch A (accumulator charged), the electrical heating elements are switched off or the valve is closed, respectively.

Figure 4:
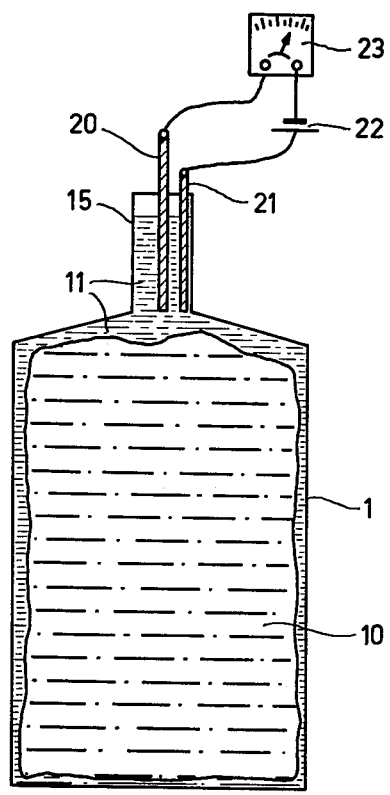

An immersion electrode 20 which is formed, for example, by a metal rod, is arranged in the neck 15 of the heat accumulator shown in FIG. 4, whilst the heat transport medium liquid 11 is electrically conductive (for example, a solution of a salt in water).

A second immersion electrode 21 of opposite polarity is secured to the wall of the neck 15.

The two electrodes form part of an electrical circuit which comprises a current source 22 and an electrical ohmmeter 23.

The electrical resistance indicated is dependent on the immersion depth of the electrodes and is hence a measure for the degree of charging of the heat accumulator.

Obviously, the level can also be measured in manners other than the ones shown, for example, by means of a capacitive path detector or a potentiometer. Optical measurement is also possible, in which case, for example, a colorant may be added to the heat transport medium liquid.

Such liquid level measuring device may also be used for controlling the extraction of heat from the heat accumulating material, for example, by the opening and closing of a valve in a duct in which a heat discharge medium flows (outlet duct 5 of FIG. 2).

What is claimed is:

1. Heat-storage apparatus, which comprises a closed reservoir having rigid walls, at least one of said walls being effective for transmission of heat; a flexible closed container positioned within said reservoir and having a maximum volume less than that of the reservoir, said flexible container enclosing a material that accumulates heat by transition from the solid phase to the liquid phase and that is capable of exchanging heat through said heat-transmitting reservoir wall, and said flexible container, when the heat-accumulating material therein is in its liquid phase, being in direct contact with the reservoir walls; and a heat-transport medium in said reservoir outside of said flexible container, said heat-transport medium being a heat-conductive substance that remains completely or substantially completely in the liquid phase throughout the effective temperature range of the apparatus and that is present in an amount to completely fill any spaces formed between the reservoir walls and the flexible container upon thermal shrinkage of the heat-accumulating material due to solidification thereof.

2. Apparatus according to claim 1, which includes means for measuring the liquid level of the heat-transport medium in the reservoir.

3. Apparatus according to claim 2, which includes means for supplying heat to or extracting heat from the heat-accumulating material, said liquid level-measuring means controlling said heat-supplying or heat-extracting means.

4. Apparatus according to claim 2, in which the reservoir is formed with a constricted upper portion, the liquid level being situated therein.

5. Apparatus according to claim 1, in which the heat-transport medium has a specific weight lower than that of the heat-accumulating material.

* * * * *